(12) United States Patent
Araki

(10) Patent No.: US 8,544,978 B2
(45) Date of Patent: Oct. 1, 2013

(54) PRINT CONTROL DEVICE, COMPUTER READABLE MEDIUM, PRINTING SYSTEM, AND RECORDING MEDIUM

(75) Inventor: Masatoshi Araki, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 1563 days.

(21) Appl. No.: 11/881,163

(22) Filed: Jul. 26, 2007

(65) Prior Publication Data
US 2008/0212112 A1 Sep. 4, 2008

(30) Foreign Application Priority Data
Mar. 1, 2007 (JP) ................ P2007-051208

(51) Int. Cl.
*B41J 29/393* (2006.01)
(52) U.S. Cl.
USPC .......................................... 347/19
(58) Field of Classification Search
USPC .......................................... 347/19
See application file for complete search history.

(56) References Cited

U.S. PATENT DOCUMENTS

| | | | | |
|---|---|---|---|---|
| 6,215,562 B1 * | 4/2001 | Michel et al. | ................. | 358/1.9 |
| 2002/0008723 A1 * | 1/2002 | Wen et al. | ................. | 347/19 |
| 2004/0169694 A1 * | 9/2004 | Yamada | ................. | 347/19 |
| 2006/0274106 A1 * | 12/2006 | Park | ................. | 347/19 |

FOREIGN PATENT DOCUMENTS

| | | |
|---|---|---|
| JP | 61-261079 | 11/1986 |
| JP | 06-226982 | 8/1994 |
| JP | 09-094950 | 4/1997 |
| JP | 09-099576 | 4/1997 |
| JP | 2003-311939 | 11/2003 |
| JP | 2005-246649 | 9/2005 |

* cited by examiner

*Primary Examiner* — Julian Huffman
(74) *Attorney, Agent, or Firm* — Fildes & Outland, P.C.

(57) ABSTRACT

A print control device includes: a drawing control unit that allows a plurality of print elements arrayed in a print head to draw a test image used for checking operation statuses of the print elements on a recording medium, classifies at least a part of the plurality of print elements into a plurality of partial arrays in each of which a constant number of print elements are successively arrayed, classifies the plurality of partial arrays into a plurality of patterns so that the numbers of print elements belonging to the partial arrays are combinations of numbers not having a common divisor other than 1, and allows the print elements disposed at corresponding positions in each of the plurality of patterns of partial arrays to sequentially draw lines on the recording medium in a predetermined direction of the recording medium so as to draw the test image.

12 Claims, 10 Drawing Sheets

| PRINT ELEMENT NUMBER | OMISSION POSITION IN 5-STEP IMAGE | OMISSION POSITION IN 7-STEP IMAGE |
|---|---|---|
| 0 | 0 | 0 |
| 1 | 1 | 1 |
| 2 | 2 | 2 |
| 3 | 3 | 3 |
| 4 | 4 | 4 |
| 5 | 0 | 5 |
| 6 | 1 | 6 |
| 7 | 2 | 0 |
| 8 | 3 | 1 |
| 9 | 4 | 2 |
| 10 | 0 | 3 |
| 11 | 1 | 4 |
| 12 | 2 | 5 |
| 13 | 3 | 6 |
| 14 | 4 | 0 |
| 15 | 0 | 1 |
| 16 | 1 | 3 |
| 17 | 2 | 3 |
| 18 | 3 | 4 |
| 19 | 4 | 5 |
| 20 | 0 | 6 |
| 21 | 1 | 0 |
| 22 | 2 | 1 |
| 23 | 3 | 3 |
| 24 | 4 | 3 |
| 25 | 0 | 4 |
| 26 | 1 | 5 |
| 27 | 2 | 6 |
| 28 | 3 | 0 |
| 29 | 4 | 1 |
| 30 | 0 | 3 |
| 31 | 1 | 3 |
| 32 | 2 | 4 |
| 33 | 3 | 5 |
| 34 | 4 | 6 |

FIG. 4 (b)

| PRINT ELEMENT NUMBER | OMISSION POSITION IN 5-STEP IMAGE | OMISSION POSITION IN 7-STEP IMAGE |
|---|---|---|
| 0 | 0 | 0 |
| 5 | 0 | 5 |
| 10 | 0 | 3 |
| 15 | 0 | 1 |
| 20 | 0 | 6 |
| 25 | 0 | 4 |
| 30 | 0 | 2 |
| 1 | 1 | 1 |
| 6 | 1 | 6 |
| 11 | 1 | 4 |
| 16 | 1 | 2 |
| 21 | 1 | 0 |
| 26 | 1 | 5 |
| 31 | 1 | 3 |
| 2 | 2 | 2 |
| 7 | 2 | 0 |
| 12 | 2 | 5 |
| 17 | 2 | 3 |
| 22 | 2 | 1 |
| 27 | 2 | 6 |
| 32 | 2 | 4 |
| 3 | 3 | 3 |
| 8 | 3 | 1 |
| 13 | 3 | 6 |
| 18 | 3 | 4 |
| 23 | 3 | 2 |
| 28 | 3 | 0 |
| 33 | 3 | 5 |
| 4 | 4 | 4 |
| 9 | 4 | 2 |
| 14 | 4 | 0 |
| 19 | 4 | 5 |
| 24 | 4 | 3 |
| 29 | 4 | 1 |
| 34 | 4 | 6 |

PRINT CONTROL DEVICE, COMPUTER READABLE MEDIUM, PRINTING SYSTEM, AND RECORDING MEDIUM

CROSS-REFERENCE TO RELATED APPLICATIONS

This application is based on and claims priority under 35 U.S.C. 119 from Japanese Patent Application No. 2007-051208 filed Mar. 1, 2007.

BACKGROUND

1. Technical Field

The present invention relates to a print control device, a computer readable medium, a printing system, and a recording medium.

2. Related Art

In recent years, increases in density and in the number of print elements of a print head have progressed with an increase in speed and an improvement in image quality of a printer. In particular, there has been proposed a plurality of printers including a print head having a print width equal to or larger than the width of a recording area, which can perform a printing operation on a part corresponding to a page width collectively. Among the printers, there are printers having the number of print elements such as liquid ejecting elements as many as several thousands of print elements, which are mounted on the print head.

In the known printers, a plurality of methods for specifying a print element having an operation defect and minimizing deterioration of the image quality has been proposed. For this reason, it is very important to specify the print element having the operation defect.

SUMMARY

According to an aspect of the present invention, a print control device including: a drawing control unit that allows a plurality of print elements arrayed in a print head to draw a test image used for checking operation statuses of the print elements on a recording medium, classifies at least a part of the plurality of print elements into a plurality of partial arrays in each of which a constant number of print elements are successively arrayed, classifies the plurality of partial arrays into a plurality of patterns so that the numbers of print elements belonging to the partial arrays are combinations of numbers not having a common divisor other than 1, and allows the print elements disposed at corresponding positions in each of the plurality of patterns of partial arrays to sequentially draw lines on the recording medium in a predetermined direction of the recording medium so as to draw the test image.

BRIEF DESCRIPTION OF THE DRAWINGS

Exemplary embodiment of the present invention will be described in detail based on the following figures, wherein.

DETAILED DESCRIPTION

Hereinafter, an exemplary embodiment for carrying out the invention will be described with reference to the accompanying drawings.

(First Embodiment)

Figure 1:
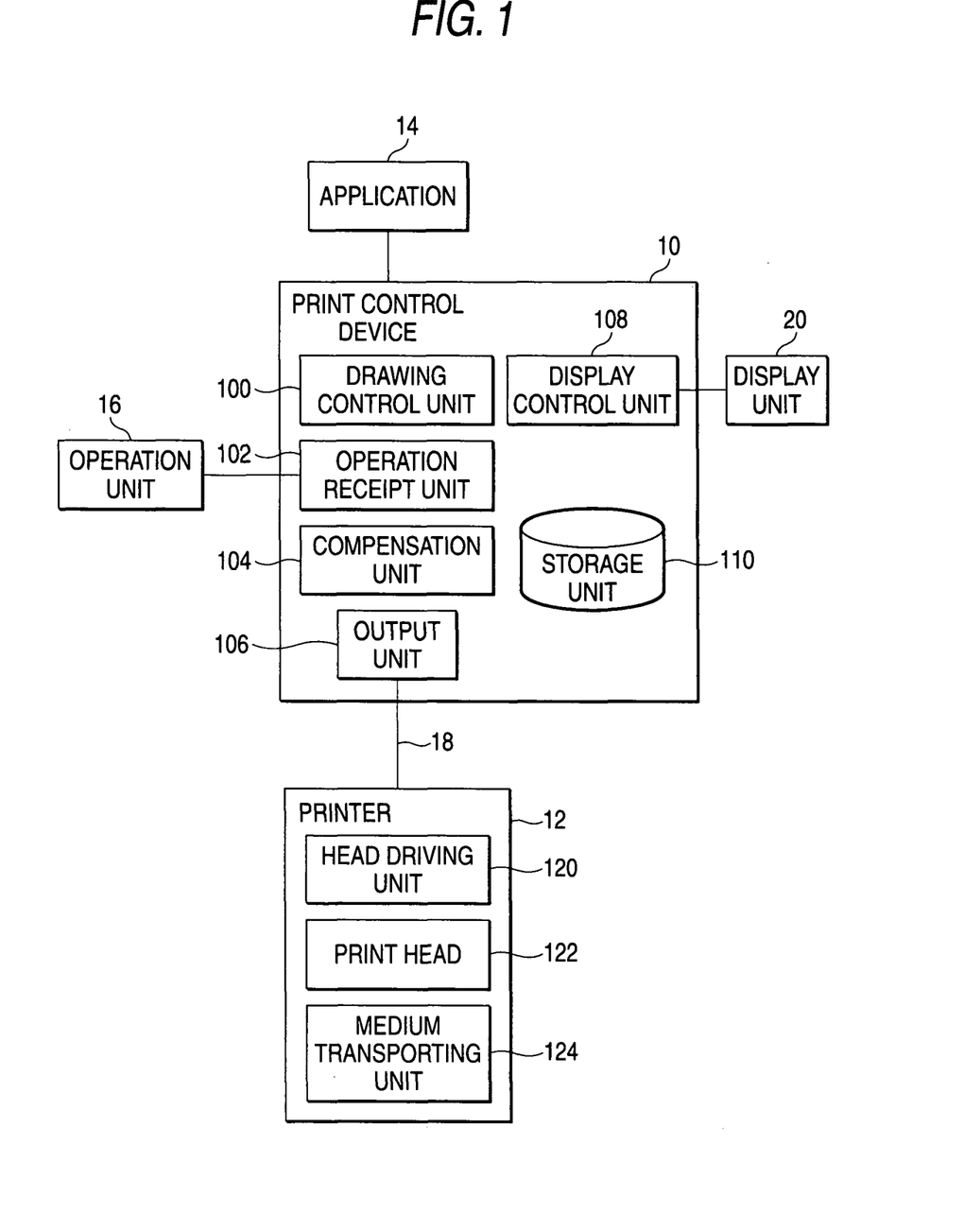
FIG. 1 is a functional block diagram of a printing system according to a first exemplary embodiment of the invention.

FIG. 1 is a functional block diagram of a printing system according to a first embodiment of the invention. In FIG. 1, the printing system includes a print control device 10 and a printer 12. The print control device 10 converts image data to be printed which is acquired from an application 14 into data of a format, which can be processed by the printer 12 and outputs the converted data to the printer 12. The printer 12 prints out the converted image data received from the print control device 10. The application 14 is general software having a function to output the image data to be printed to the print control device 10 in accordance with a print command.

The print control device 10 includes a drawing control unit 100, an operation receipt unit 102, a compensation unit 104, an output unit 106, a display control unit 108, and a storage unit 110.

The drawing control unit 100 is realized by a central processing unit (CPU) and a program for controlling a processing operation of the CPU. The drawing control unit 100 converts the image data acquired from the application 14 into print data which can be processed by the printer 12. The drawing control unit 100 generates test image data so as to draw the test image data for checking operation statuses of a plurality of print elements arrayed in the print head of the printer 12 to be described later to a recording medium. The test image data may be generated by means of data previously stored in the storage unit 110 and data acquired from the outside via proper communication interfaces such as a USB (Universal Serial Bus) port, a network port, and the like.

The operation receipt unit 102 is realized the CPU and the program for controlling the processing operation of the CPU. The operation receipt unit 102 receives an input from an operation unit 16. The input includes defect information on a print element having an operation defect among the plurality of print elements arrayed in the print head 122 disposed in the printer 12. The defect information includes the number of the print element having the operation defect.

The compensation unit 104 is realized by the CPU and the program for controlling the processing operation of the CPU. The compensation unit 104 generates compensation information used for compensating the printing operation of the print head 122 on the basis of the defect information. When the compensation information is generated, the compensation unit 104 also performs a process of specifying the print element having the operation defect. The print element is specified by means of a predetermined table or a predetermined expression, for example. The table and the expression will be described later.

The output unit 106 is realized by the CPU and the program for controlling the processing operation of the CPU. The drawing control unit 100 outputs the print data and the test image data generated by the drawing control unit 100 to the printer 12 via a communication unit 18.

The display control unit 108 is realized by the CPU and the program for controlling the processing operation of the CPU. The display control unit 108 controls an operation of displaying an image for requesting input of the defect information of a user on a display unit 20.

The storage unit 110 is realized by a Random Access Memory (RAM) used as a working memory of the CPU, a magnetic storage device such as a hard disk device, and a computer-readable storage device. The storage unit 110 stores the program for controlling the processing operation of the CPU and the test image data.

The operation unit 16 is realized by data input devices such as a keyboard, a mouse, and a touch panel. The operation unit 16 allows the user to input the defect information on the print element having the operation defect. The communication unit 18 is realized by the proper communication interfaces such as the USB (Universal Serial Bus) port, the network port, and the like. The communication unit 18 transmits and receives data between the output unit 106 and the printer 12. The display unit 20 is realized by a display device such as a liquid crystal display. The display unit 20 displays various images on the basis of the control performed by the display control unit 108.

The printer 12 includes a head driving unit 120, the print head 122, and a medium transporting unit 124.

The head driving unit 120 controls an operation of the print head 122 on the basis of the print data and the test image data received from the print control device 10.

The print head 122 is constituted by the plurality of print elements such as ink droplet ejecting nozzles arrayed therein. The print head 122 prints the image on the recording medium such as printing paper.

The medium transporting unit 124 transports a recording medium on which the image is printed by the print head 122 in synchronization with a print timing of the print head 122. As described above, when the recording medium passes through an area opposed to the print head 122, liquid droplets are ejected from the print head 122 in accordance with the print data, whereby the image is formed on the recording medium.

Figure 2:
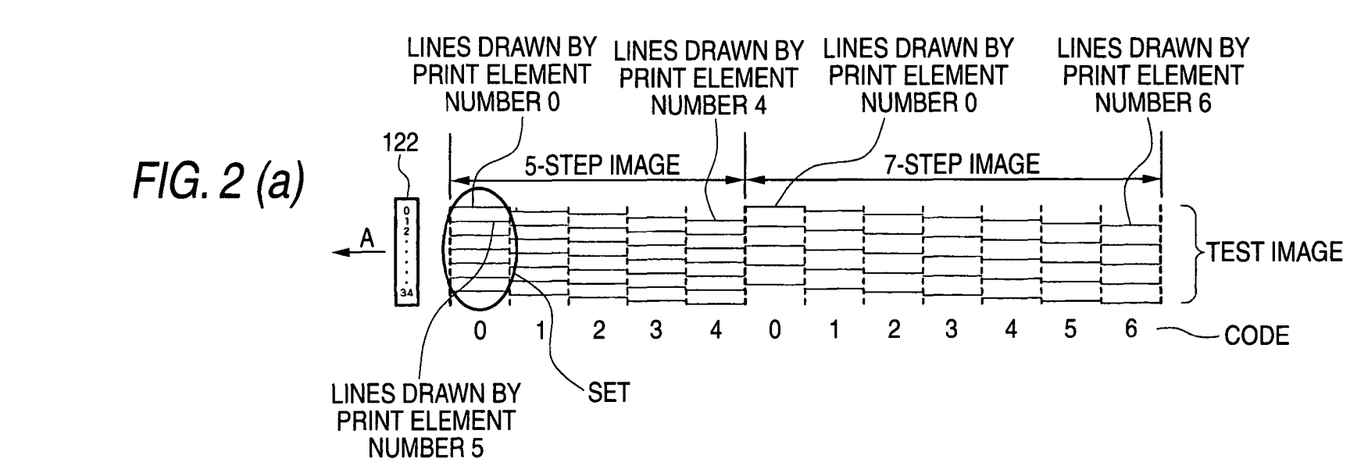
FIGS. 2A and 2B illustrate exemplary examples of a test image according to the first embodiment.

FIGS. 2A and 2B illustrate an example of a test image printed out by the printer 12 on the basis of the test image data generated by the drawing control unit 100. The example is the test image drawn by the print head 122 having 35 print elements arrayed therein.

In FIG. 2A, regarding the test image, the drawing control unit 100 classifies the plurality of (35) print elements arrayed in the print head 122 into a plurality of partial arrays in each of which a constant number of print elements are successively arrayed, classifies the plurality of partial arrays into a plurality of kinds so that the numbers of print elements belonging to the partial arrays are combinations of numbers (5 and 7) not having a common divisor other than 1, and allows the print elements disposed at corresponding positions in the kinds of partial arrays to sequentially draw lines on the recording medium in a predetermined direction (a paper feeding direction) of the recording medium, thereby generating the test image data and drawing it to the printer 12. An arrow A direction shown in FIG. 2A indicates the paper feeding direction and the print elements are arrayed in the print head 122 in a direction (for example, perpendicular to) crossing the paper feeding direction.

Figure 3:
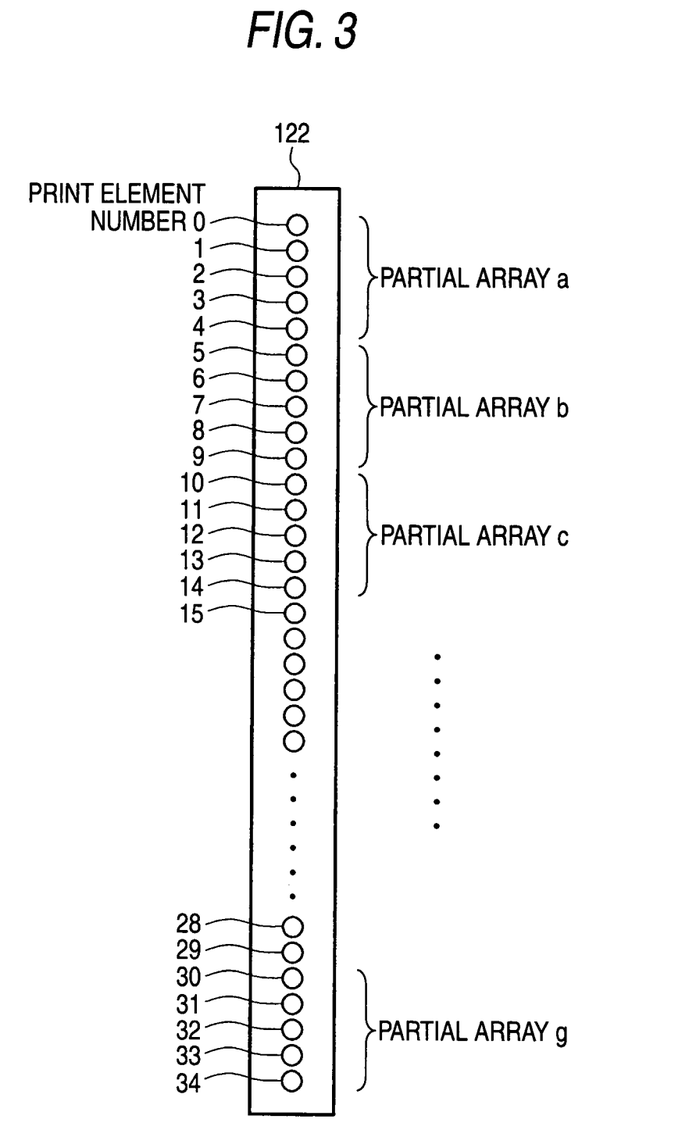
FIG. 3 illustrates an array example of print elements in a print head.

FIG. 3 illustrates an array example of the print elements in the print head 122. In FIG. 3, 35 print elements are arrayed. Here, when numbers of 0 to 34 (total 35) are allocated to the print elements, the number of partial arrays having 5 print elements is set to 7 (a to g) and the partial arrays a to g include print elements 0 to 4, 5 to 9, 10 to 14, 15 to 19, 20 to 24, 25 to 29, and 30 to 34, respectively. Lines having the same length are drawn parallel to the paper feeding direction in the order of parentheses (I to V) by the print elements disposed at corresponding positions in the partial arrays, that is, print elements of I: (0, 5, 10, 15, 20, 25, and 30), II: (1, 6, 11, 16, 21, 26, and 31), III: (2, 7, 12, 17, 22, 27, and 32), IV: (3, 8, 13, 18, 23, 28, and 33), and V: (4, 9, 14, 19, 24, 29, and 34), thereby drawing 5-step image having 5 sets of lines constituted by 7 parallel lines evenly spaced from each other formed therein. In FIG. 2A, although an example in which the print elements in the parentheses perform the drawing of the lines at the same time is shown, the drawing may be performed by the print elements at the timing when a starting point and an ending point of each of the lines belonging to the same set are disposed on a straight line. By this configuration, a test image may be formed which is deviated obliquely in the paper feeding direction. Although the parallel lines are drawn to the corresponding print elements disclosed in the parentheses in the order of the parentheses in FIG. 2A, the order of the parentheses is not limited to it and the print elements may be arrayed in another order. Although FIG. 3 illustrates an example of the print elements arrayed in line, the array of the print elements is not limited to it and the print elements are evenly spaced in a direction perpendicular to a relative movement direction between the print head 122 and the recording medium in printing. For example, the print elements may be arrayed in zigzags, that is, the print elements may be arrayed in two dimensions.

Similarly, the number of partial arrays each having 7 print elements is set to five, whereby a 7-step image is drawn in which seven sets of lines constituted by 5 parallel lines evenly spaced from each other are formed.

As described above, in FIG. 2A, the test image is formed of 2 straight line groups formed of the 5-step image and the 7-step image. In this case, the numbers of sets belonging to the straight line groups are set to 5 and 7 identical to the numbers of the print elements belonging to the corresponding partial arrays, respectively. The numbers of sets in the straight line groups are formed of the combinations of the numbers each not having a common divisor other than 1 (the relationship is hereinafter referred to as a "relatively prime relationship". It is preferable that the test image is drawn with one scanning of the print head 122 by control performed by the head driving unit 120. Codes for identifying the print elements may be drawn in the test image. In the example shown in FIG. 2A, the codes are denoted by numbers starting from 0, and numbers of 0 to 4 are attached to the codes in the 5-step image and numbers of 0 to 6 are attached to the codes in the 7-step image. The codes can specify each of the sets lines belonging to the one straight line group. The codes may be represented by symbols (for example, A, B, C, . . . ) other than the numbers. Although the codes indicate the order of the parentheses (the order of I to V in the 5-step image) representing the print elements used for drawing the sets of lines, the above-mentioned order may not be the order of I, II, III, IV, and V as described above. When the order is changed, the order of the codes shown in FIG. 2A, which correspond thereto, is also changed. For example, when the drawing order of each of the print elements belonging to parentheses I and II is changed, the order of the codes corresponding thereto is also changed from 0→1 to 1→0.

FIG. 2B illustrates an example of a test image at the time when some print elements arrayed in the print head 122 have the operation defect (a state in which drawing is unavailable). In the example, two print elements have the operation defect and are referred to as Defect 1 and Defect 2, respectively. Parts in which lines are omitted are produced in the 5-step image and the 7-step image due to the print elements which cannot perform the drawing operation.

In the test image according to the embodiment, the compensation unit 104 specifies the print elements each having the operation defect as described below on the basis of the position of the omission part (hereinafter, referred to as an omission position).

That is to say, when the numbers of the print elements are denoted by the numbers starting from 0 and the number of the print element having the operation defect is denoted by X, the omission position is shown at the position of a code corresponding to a remainder of X÷5 in the 5-step image and the omission position is shown at the position of a code corresponding to a remainder of X÷7 in the 7-step image. The numbers of sets belonging to the straight line groups, that is, the numbers of steps have a relatively prime relationship therebetween, whereby the combinations thereof and the X have a one-to-one relationship therebetween. For this reason, the product of the numbers of steps becomes the maximum value of X which can be specified.

In the example of FIG. 2B, the omission positions occurring due to Defect 1 correspond to the position of Code 0 in the 5-step image and to the position of Code 3 in the 7-step image. The values of the codes are input from the operation unit 16 by the user and the input values of the codes are transferred to the compensation unit 104 by the operation receipt unit 102. Here, the print element number in Defect 1 is denoted by X and the relationship between the X and the omission position input by the user is expressed by the following congruence expressions:

$X \equiv 0 \pmod{5}$, where a remainder of X÷5 is 0 and  Expression (1)

$X-3 \equiv 0 \pmod{7}$, where a remainder of (X−3)÷7 is 0.  Expression (2)

X is the multiple of 5 in Expression (1). When X=5k is substituted into the congruence expression of Expression (2), $5k-3 \equiv 0 \pmod{7}$.  Expression (3)

Accordingly, $5k \equiv 3 \pmod{7}$. By additional transformation, $7k-2k \equiv 3 \pmod{7}$.

Here, since 7k is dividable by 7 (the remainder thereof is 0), $-2k \equiv 3 \pmod{7}$.  Expression (4)

Therefore, $2k \equiv -3 \pmod{7}$. Accordingly, $2k \equiv 4 \pmod{7}$ and $k \equiv 2 \pmod{7}$.

Accordingly, when k is divided by 7, the remainder thereof is 2, whereby k can be written by k=7I+2. Here, I is an integer number. When X is expressed by I, $X=5k=5(7I+2)=35I+10$.  Expression (5)

However, X=10 when 0≤x≤34, whereby the number of the print element in Defect 1 corresponds to 10.

The omission positions occurring due to Defect 2 correspond to the position of Code 1 in the 5-step image and to the position of Code 5 in the 7-step image. Accordingly, the congruence expressions thereof can be written by $X-1 \equiv 0 \pmod 5$ and $X-5 \equiv 0 \pmod 7$. When the expressions are solved in the same manner as in a case relating to Defect 1, X=26 and thus, the number of the print element in Defect 2 is 26.

As described above, it is possible to specify the print element having the operation defect by means of the expressions called the congruence expression in the test image according to the embodiment. A calculation method using a sequential substitution method may be used for specifying the print element having the operation defect. For example, in an example of Defect 1, candidates satisfying the range of 0≤x≤34 as X=5a are shown in a table form (0, 5, 10, 15, 20, 25, and 30). It is judged whether remainders when subtracting 3 from candidates satisfying the expression of X=7b+3 are dividable by 7 among the above-mentioned candidates. The value (in this case, 10) of the corresponding candidate is specified as the number of the print element having the operation defect.

A predetermined table may be used for specifying the print element having the operation defect.

Figure 4:
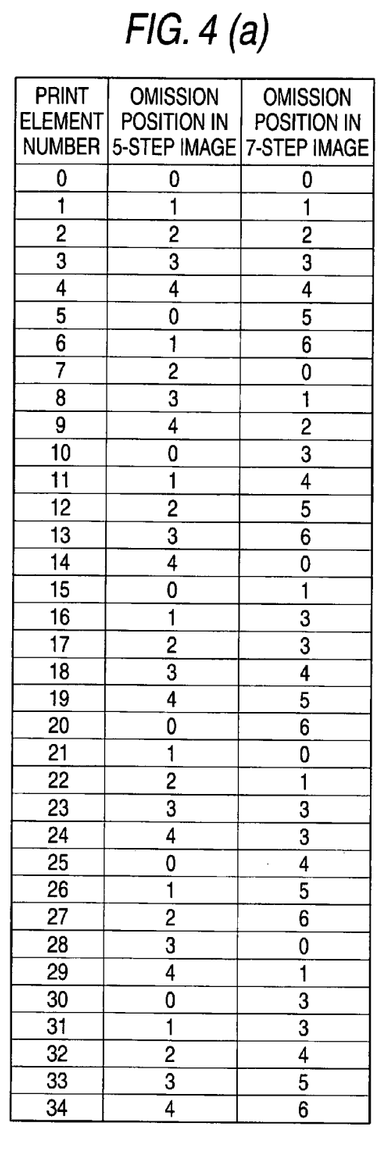
FIGS. 4A and 4B illustrate exemplary examples of a table used for specifying a print element having an operation defect.

FIGS. 4A and 4B illustrate examples of tables used for specifying the print elements each having the operation defect. FIGS. 4A and 4B are tables used for specifying the print elements each having the operation defect in the print head 122 having 35 print elements arrayed therein.

In FIG. 4A, when the print elements each have the operation defect, the omission position occurring in each of the 5-step image and the 7-step image is organized by each of the numbers of the print elements. As known from FIG. 4A, the code of each omission position is a remainder when dividing the number of the print element by the step numbers (5 and 7).

FIG. 4B is a table organizing FIG. 4A at the omission position in the 5-step image. As know from FIG. 4B, the omission position in the 5-step image and the omission position in the 7-step image are the sole combination with respect to 35 print elements.

The compensation unit 104 can specify the print elements each having the operation defect with reference to FIGS. 4A and 4B on the basis of the codes input from the operation unit 16 by the user. For example, in the case relating to the above-mentioned Defect 1, since the omission position in the 5-step image corresponds to Code 0 and the omission position in the 7-step image corresponds to Code 3, it is possible to specify the number of the print element having the operation defect as 10 from FIGS. 4A and 4B. Similarly, relating to Defect 2, since the omission position in the 5-step image corresponds to Code 1 and the omission position in the 7-step image corresponds to Code 5, it is possible to specify the number of the print element having the operation defect as 26.

In the above-mentioned embodiment, the position of a set to which the omission position belongs is checked without counting the number of the print element having the operation defect on the test image, whereby it is possible to easily and accurately specify the print element having the operation defect.

In the embodiment, as shown in FIGS. 2A and 2B, although the 5-step image and the 7-step image are used and the print head 122 having 35 print elements arrayed therein is identifiable, the number of the print elements of the print head 122 may be in the range of the least common multiple (5×7 in the examples of FIGS. 2A and 2B) of the numbers of steps of a selected image. For example, when the number of the print elements is not dividable by the number of the steps of the image, the number (a remainder when dividing the number of the print elements by the number of the steps of the image) smaller than other partial arrays is allocated to the last partial array. For example, although numbers 0 to 33 (total 34) are allocated to the print elements and seven partial arrays (a to g) are set when intending to form the 5-step image with the print head 122 having the 34 print elements arrayed therein, five print elements are allocated to each of the partial arrays a to f and not five but four print elements are allocated to the last partial array g. Lines having the same length are drawn parallel to the paper feeding direction in the order of parentheses (I to V) by the print elements disposed at positions corresponding to each other in the partial arrays, that is, the print elements of I: (0, 5, 10, 15, 20, 25, and 30), II: (1, 6, 11, 16, 21, 26, and 31), III: (2, 7, 12, 17, 22, 27, and 32), IV: (3, 8, 13, 18, 23, 28, and 33), and V: (4, 9, 14, 19, 24, and 29), whereby a 5-step image in which the line drawn by the last print element (number 34 of FIG. 3) is omitted is drawn. In the 5-step image, the number of lines in the fifth set of lines becomes 6. When the number of the print elements is 33, three print elements are allocated to the last partial array g and the number of lines in each of the fourth and fifth sets of lines becomes 6.

Similarly, in the 7-step image, when the number of the print elements is 34, 6 print elements are allocated to the last partial array having five print elements and the number of the seventh set of lines becomes 4. When the number of the print elements is 33, 5 print elements are allocated to the last partial array and the number of lines in each of the sixth and seventh sets of lines becomes 4.

Meanwhile, when checking operation statuses of some print elements selected from the print elements arrayed in the print head 122, the test image is drawn by the some successive print elements. For example, 144 print elements are arrayed in the print head 122 and when checking operation statuses of 35 successive print elements selected from them, the test image formed of the 5-step image and the 7-step image is drawn by using the 35 print elements.

The lengths of lines drawn by the print elements may not be the same as each other. Although the lengths of the lines may be different from each other at the time when line omission occurring due to the operation defect of the print element can be identified, it is possible to identify the position of the line omission more easily and accurately when the length of the lines drawn by the print elements are the same as each other. Accordingly, it is more preferable that the lengths of the lines drawn by the print elements are the same as each other.

Figure 5:
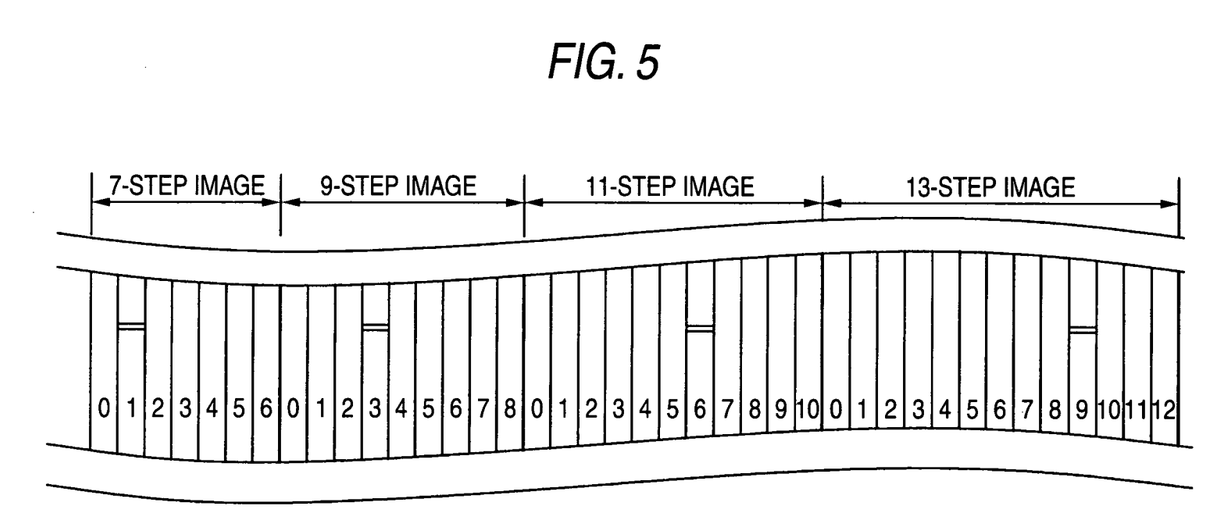
FIG. 5 illustrates another exemplary example of the test image according to the first embodiment.

FIG. 5 illustrates another example of the test image. FIG. 5 illustrates an example of a case in which the number of the print elements arrayed in the print head 122 becomes multiple. In a print head having a print width equal to or larger than the width of a recording area of the recording medium, the number of the print elements increases, for example, the print head 122 may have 6,880 print elements arrayed therein.

In the example of FIG. 5, the test image is formed of the above-mentioned 7-step image having 7 sets of lines, 9-step image having 9 sets of lines, 11-step image having 11 sets of lines, and 13-step image having 13 sets of lines. Here, since 7, 9, 11, and 13 have the relatively prime relationship therebetween and 7×9×11×13=9009>6880, it is possible to specify the print elements each having the operation defect from the omission position of each step. The print head 122 of the embodiment has the print width equal to or larger than the width of the recording area of the recording medium, whereby it is difficult to draw the codes outside the test image. Therefore, the codes are drawn within the test image.

In FIG. 5, each step has one omission position. The omission position in the 7-step image corresponds to the position of Code 1, the omission position in the 9-step image corresponds to the position of Code 3, the omission position in the 11-step image corresponds to the position of Code 6, and the omission position in the 13-step image corresponds to the position of Code 9.

In the example of FIG. 5, the compensation unit 104 can also specify the print elements each having the operation defect by using a predetermined expression (congruence expression) or a predetermined table on the basis of the information on the omission positions. Hereinafter, a method of specifying the print elements by using the congruence expression will be exemplified.

When the omission position in the 7-step image is 1, the omission position in the 9-step image is 3, the omission position in the 11-step image is 6, and the omission position in the 13-step image is 9, the congruence expressions thereof can be written by:

$$X-1 \equiv 0 \pmod{7} \tag{1}$$

$$X-3 \equiv 0 \pmod{9} \tag{2}$$

$$X-6 \equiv 0 \pmod{11} \tag{3}$$

$$X-9 \equiv 0 \pmod{13}. \tag{4}$$

In Expression (3), X−6 is the multiple of 11. Therefore, when X−6=11k, Expression (2) becomes X−6+3≡0 (mod 9) and 11k+3≡0 (mod 9), whereby 9k+2k≡−3 (mod 9).

Here, 9k is dividable by 9, whereby 2k≡−3 (mod 9). A case in which the remainder is −3 is the same as a case in which the remainder is 6, whereby 2k≡6 (mod 9). Since 2 and 9 have the relatively prime relationship therebetween, 2k≡6 (mod 9) can be transformed into k≡3 (mod 9). When k is divided by 9, the remainder is 3, that is, k is given by k=9I+3 (I is the integer number).

Next, when X−6=11k and k=9I+3 are substituted into Expression (4), $$X-6-3 \equiv 0 \pmod{13}. \qquad \text{Expression (5)}$$

Accordingly, 11(9I+3)−3≡0 (mod 13) and 99I+30≡0 (mod 13) By transforming them, 91I+8I+26+4≡0 (mod 13). Here, since 91I and 26 are the multiples of 13, 8I≡4 (mod 13) and since 4 and 13 have the relatively prime relationship therebetween, 2I≡−1 (mod 13). Since a case in which the remainder is −1 is the same as a case in which the remainder is 12, 2I≡12 (mod 13). Since 2 and 13 have the relatively prime relationship, 2I≡12 (mod 13) is transformed into I≡6 (mod 13) When I is divided by 13, the remainder thereof is 6, that is, I=13m+6.

Next, when X−6=11k, k=9I+3, and I=13m+6 are substituted into Expression (1), $$X-6+5 \equiv 0 \pmod{7}. \qquad \text{Expression (6)}$$

Accordingly, 11(9(13m+6)+3)+5≡0 (mod 7) and 1,287m+632≡0 (mod 7).
Therefore, $$1{,}281m+6m+630+2 \equiv 0 \pmod{7}. \qquad \text{Expression (7)}$$

Here, since 1,281m and 630 are the multiples of 7, 6m≡−2 (mod 7). Since 2 and 7 have the relatively prime relationship, 3m≡−1 (mod 7). Since a case in which the remainder is −1 is the same as a case in which the remainder is 6, 3m≡6 (mod 7). Since 3 and 7 have the relatively prime relationship, 3m≡6 (mod 7) is transformed into m≡2 (mod 7). When m is divided by 7, the remainder thereof is 2, that is, m=7n+2. Accordingly, $$X=11k+6=11(9I+3)+6=11(9(13m+6)+3)+6=11(9(13(7n+2)+6)+3)+6 \text{ and} \qquad \text{Expression (8)}$$

$$X=9{,}009n+3{,}207. \qquad \text{Expression (9)}$$

Here, since the numbers of nozzles are in the range of 0≤X≤6,879, the number of the print element having the operation defect is 3,207.

Figure 6:
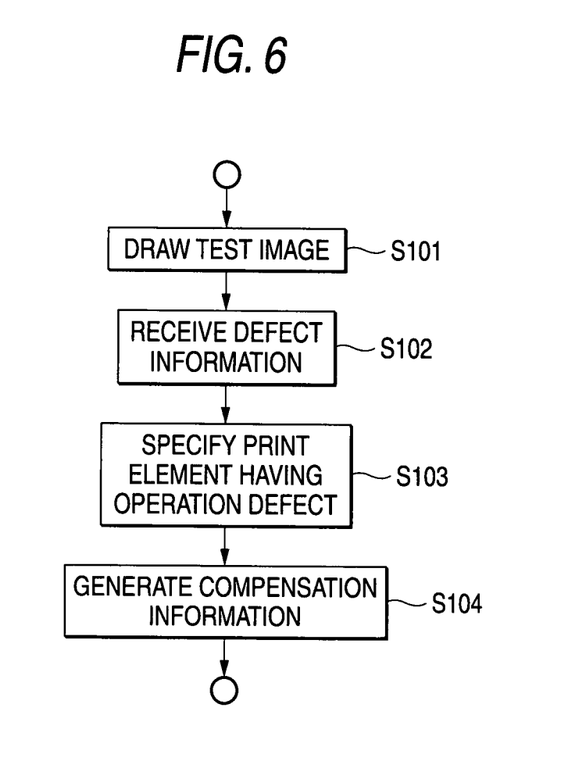
FIG. 6 is a flowchart illustrating an operation example of a print control device according to the first embodiment.

FIG. 6 illustrates a flow of an operation example of the print control device 10 according to the embodiment. In FIG. 6, the drawing control unit 100 generates test image data and allows each of the print elements arrayed in the print head 122 of the printing apparatus 12 to draw the test image (S101). The test image is drawn on the recording medium such as the printing paper.

Next, the user checks whether or not an omission position occurs with reference to the recording medium on which the test image is drawn. Assuming that the omission position occurs, a code indicating the position thereof is input through the operation unit 16. The operation receipt unit 102 receives the input code as defect information (S102). In this case, the operation receipt unit 102 serves as defect information receiving means of the invention.

The operation receipt unit 102 transfers the received code to the compensation unit 104 and the compensation unit 104 specifies the print elements each having the operation defect by using a predetermined expression or a predetermined table in accordance with an order described in FIGS. 2A and 2B, FIGS. 4A and 4B, and FIG. 5 described above (S103).

Next, the compensation unit 104 generates compensation information used for compensating printing operations of other print elements arrayed in the print head 122 so as to reduce influences of the specified print elements each having the operation defect (S104). Regarding the compensation of the printing operation, the compensation unit 104 performs a process of decreasing a resolution in the vicinity of the print element having the operation defect in resolution conversion, for example. The compensation is performed so as to increase a density in the vicinity of the print element having the operation defect in color conversion. In a half-tone process, the compensation unit 104 performs a compensation operation for injecting ink droplets larger than general ink droplets into print elements adjacent to the print element having the operation defect (for a print element of a liquid droplet ejection type). All the compensation operations may be performed at the same time and only one compensation operation may be performed.

(Second Embodiment)

The peculiar point in the embodiment is in the fact that the operation receipt unit 102 checks the authenticity of the defect information input through the operation unit 16 by the user, that is, the information on the omission position for specifying the print element having the operation defect and when the operation receipt unit 102 judges that the information is false, the operation receipt unit 16 request reinput of the defect information.

Figure 7:
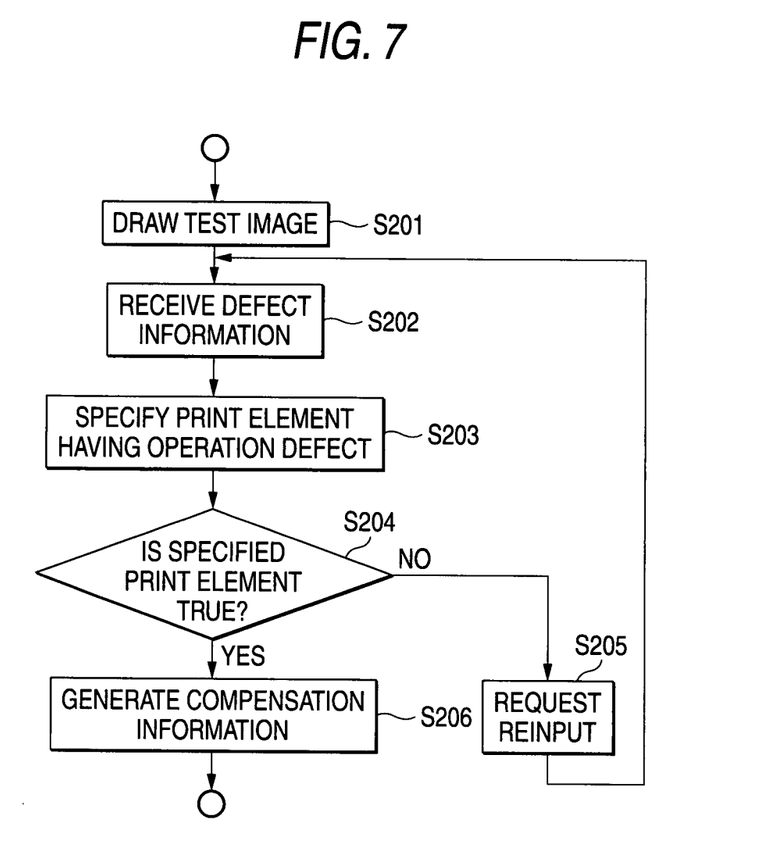
FIG. 7 is a flowchart illustrating an operation example of a print control device according to a second exemplary embodiment.

FIG. 7 illustrates a flow of an operation example of a print control device 10 according to the embodiment. In FIG. 7, the drawing control unit 100 generates the test image data and allows each of the print elements arrayed in the print head 122 of the printing apparatus 12 to draw the test image (S201). The test image is drawn on the recording medium such as the printing paper.

Next, the user checks whether or not an omission position occurs with reference to the recording medium on which the test image is drawn. Assuming that the omission position occurs, a code indicating the position thereof is input through the operation unit 16. In this case, the operation receipt unit 102 serves as the defect information receiving means of the invention (S202).

The operation receipt unit 102 transfers the received code to the compensation unit 104 and the compensation unit 104 specifies the print elements each having the operation defect by using a predetermined expression or a predetermined table in accordance with the order described in the first embodiment (S203).

Next, the operation receipt unit 102 receives the number of the print element specified by the compensation unit 104 and checks the authenticity of the number (S204). The authenticity thereof can be checked by judging whether or not the number specified by the compensation unit 104 is larger than the number of the print elements of the print head 122. In the embodiment, for example, as shown in FIG. 5, the number which can be specified by the test image is larger than the number of the print elements. When the specified number is larger than the number of the print elements, the operation receipt unit 102 judges that the number is false. The number of the print elements may be acquired from the printer and may be stored in the storage unit 110 in advance.

In S204, when the number specified by the compensation unit 104 is not true (false), the operation receipt unit 102 requests the reinput of the defect information (S205). The display control unit 108 performs a display of intent to request the reinput on the display unit 20 on the basis of a command received from the operation receipt unit 102, whereby the request for the reinput is performed.

Meanwhile, in S204, when the number specified by the compensation unit 104 is true, the compensation unit 104 generates the compensation information used for compensating the printing operations of other print elements arrayed in the print head 122 so as to decrease the influences of the print elements each having the operation defect (S206).

In FIG. 7, although the compensation unit 104 checks the authenticity of the specified number, the user may count the number of the print element having the operation defect from the test image and thus, may check the authenticity of the number of the print element having the operation defect by inputting the counted value.

Figure 8:
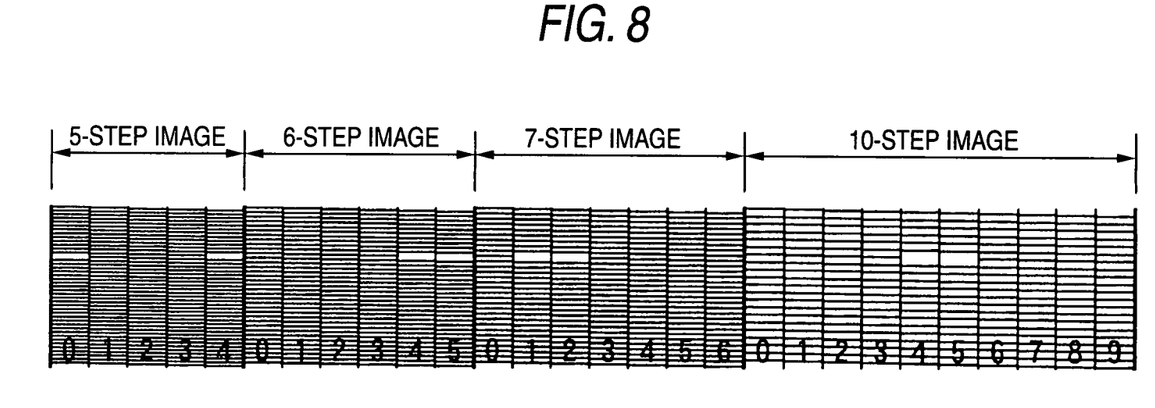
FIG. 8 illustrates an example of a test image according to the second exemplary embodiment.

FIG. 8 illustrates an example of the test image according to the embodiment. In FIG. 8, the test image is formed of the 5-step image, a 6-step image, the 7-step image, and a 10-step image. The print elements each having the operation defect are specified by the 5-step image, the 6-step image, and the 7-step image among them. The authenticity of the number of the print element specified by the 10-step image is checked. The 10-step image corresponds to an authenticity check image of the invention. The operation defects of the print elements of up to 5×6×7=210 can be specified by the 5-step image, the 6-step image, and the 7-step image.

In the example shown in FIG. 8, two print elements have the operation defect. The omission positions in the 5-step image correspond to 0 and 4, the omission positions in the 6-step image correspond to 4 and 5, the omission positions in the 7-step image correspond to 1 and 2, and the omission positions in the 10-step image correspond to 4 and 5.

Here, the user needs to input two sets of omission positions in each of the 5-step image, the 6-step image, and the 7-step image from the operation unit 16 in correspondence with two print elements so as to specify the print elements each having the operation defect. In other words, it is necessary to input 4, 4, and 1 as the omission position of the first print element and to input 0, 5, and 2 as the omission position of the second print element, respectively. However, there is a possibility that 0, 4, and 1 will be input as the omission position of the first print element by misreading the omission positions of the first print element and the second print element in the 5-step image. This reason is that two omission positions in the 5-step image are spaced from each other in a horizontal direction and it is difficult to read an omission position corresponding to the code 4 precedes an omission position corresponding to Code 0 in the order of the print elements.

In the example of FIG. 8, the omission position in the 10-step image is also input so as to detect the misreading. The omission position in the 10-step image corresponds to a remainder when dividing the number of the print element having the operation defect, which corresponds to the omission position, by 10. In FIG. 8, the omission position of the first print element corresponds to 4 and when the number of the first print element having the operation defect is divided by 10, a remainder thereof is 4.

Meanwhile, when 0, 4, and 1 are mistakenly input as the omission positions in the 5-step image, the 6-step image, and the 7-step image, 190 is determined as the number of the print element having the operation defect in accordance with the method described in the first embodiment. Since 190 is dividable by 10, the number of the print element having the operation defect mismatches the omission position in the 10-step image. Therefore, defect information on the omission positions in the 5-step image, the 6-step image, and the 7-step image is not true (false).

Figure 9:
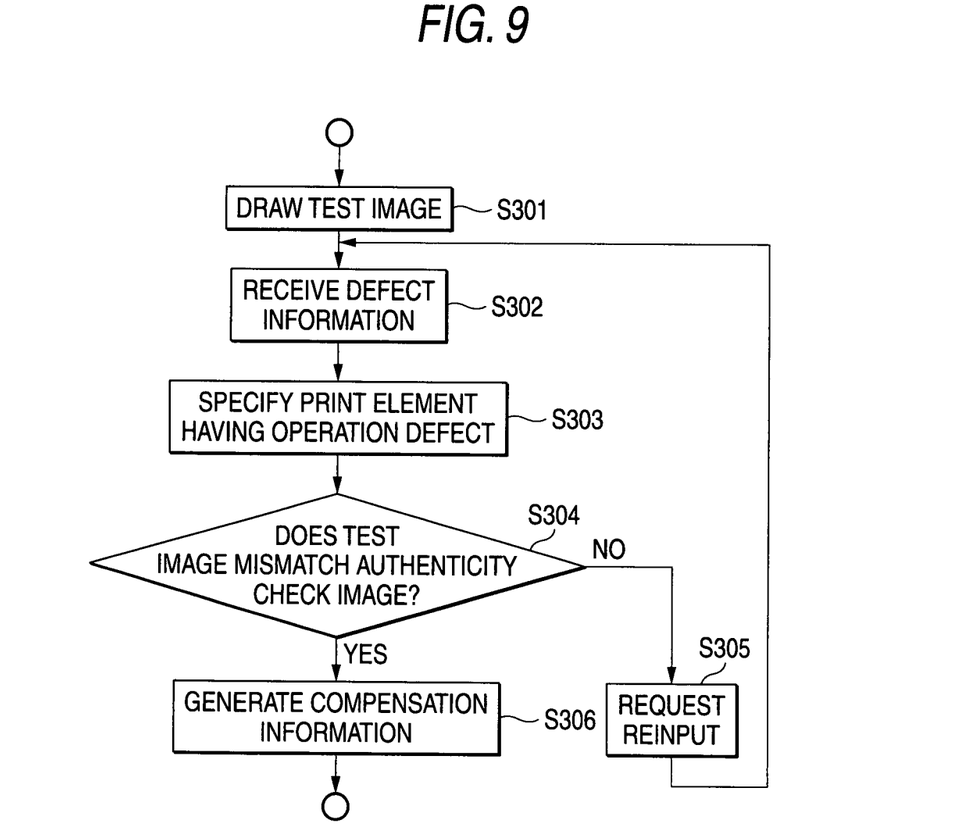
FIG. 9 is a flowchart illustrating another operation example of the print control device according to the second exemplary embodiment.

FIG. 9 illustrates a flow of another operation example of the print control device 10 according to the embodiment. In FIG. 9, the authenticity of the input defect information is judged by the authenticity check image shown in FIG. 8.

In FIG. 9, the drawing control unit 100 causes the print elements arrayed in the print head 122 to draw the test image on the recording medium (S301) and when an omission position occurs in the recording medium in which the test image is drawn, the user inputs a code indicating the omission position as the defect information through the operation unit 16. The operation receipt unit 102 receives the input code as the defect information (S302).

The operation receipt unit 102 transfers the received code to the compensation unit 104 and the compensation unit 104 specifies the print elements each having the operation defect by using a predetermined expression or a predetermined table in the order described in the first embodiment (S303).

Next, the operation receipt unit 102 receives the number of the print element specified by the compensation unit 104 and checks whether or not the number mismatches the omission position in the authenticity check image (S304).

In S304, when the number of the print element specified by the compensation unit 104 mismatches the omission position in the authenticity check image, the operation receipt unit 102 requests the reinput of the defect information (S305).

Meanwhile, in S304, when the number of the print element specified by the compensation unit 104 matches the omission position in the authenticity check image, the compensation unit 102 generates the compensation information used for compensating the printing operations of other print elements arrayed in the print head 122 so as to reduce the influence of the specified print element having the operation defect (S306).

Figure 10:
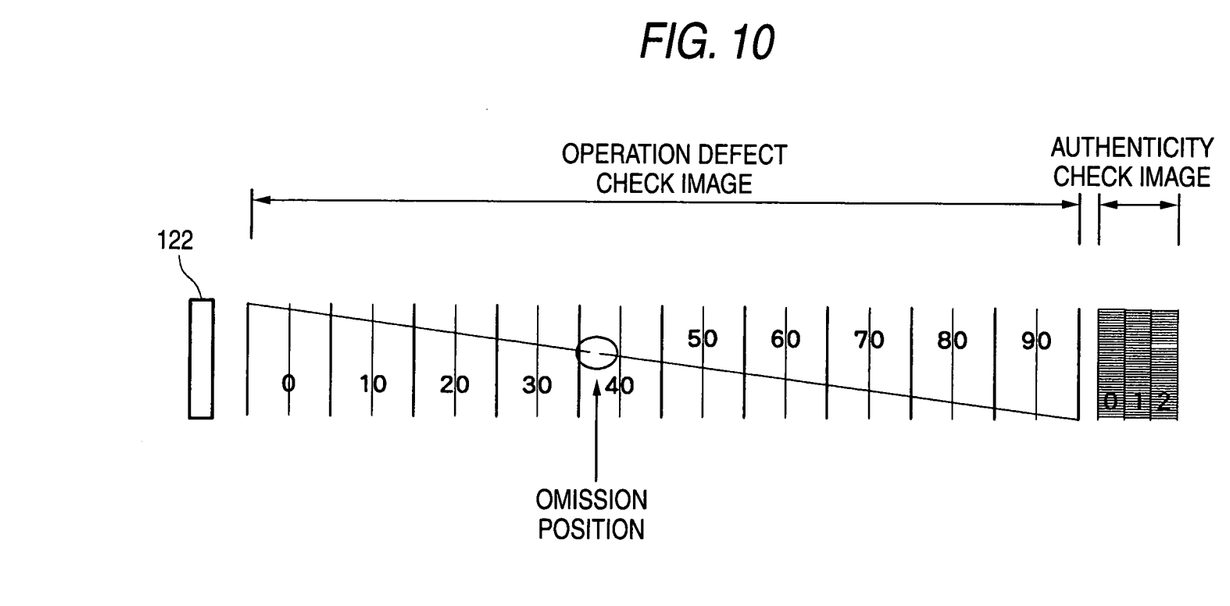
FIG. 10 illustrates another example of the test image according to the second exemplary embodiment.

FIG. 10 illustrates another example of the test image according to the embodiment. FIG. 10 illustrates a test image used for specifying the print elements each having the operation defect and for checking the authenticities thereof when 100 print elements are arrayed in the print head 122.

In FIG. 10, the test image is formed of an operation defect check image and the authenticity check image.

The operation defect check image is drawn in a step shape in which one horizontal line (a line drawn in a horizontal direction of the figure) corresponds to one print element arrayed in the print head 122. When the print element having the operation defect occurs in the test image, a horizontal line to be drawn by the print element is not drawn and is recognized as the omission position. FIG. 10 illustrates an example in which a print element of number 41 has the operation defect. As shown in FIG. 10, it is preferable to additionally record the figure of the number so as to read the number of the print element.

The authenticity check image is formed of a 3-step image and thus, the omission position corresponds to a position of the value of a remainder when the number of the print element is divided by 3.

When the test image shown in FIG. 10 is used, the user reads the omission position and inputs the read omission position through the operation unit with reference to the operation defect check image.

In this case, since the number of the print element having the operation defect is directly input, the compensation unit 104 needs not to specify the number of the print element. The user also inputs the omission position of the authenticity check image.

Next, the operation receipt unit 102 checks whether or not the number of the print element input by the user mismatches the omission position in the authenticity check image. The operation receipt unit 102 request the reinput of the defect information for mismatching and the compensation unit 104 generates the compensation information for matching.

In the example of FIG. 10, when 41 is input as the number of the print element having the operation defect, the number matches an omission position 2 in the authenticity check image. Meanwhile, when 42 is input by misreading the number of the print element, the number is dividable by 3 and thus, mismatches the omission position 2 in the authenticity check image, whereby it is possible to detect a defect.

A program for executing each of steps of FIGS. 6, 7, and 9 may be provided through communication means or by storage in a storage medium such as a CD-ROM.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A print control device comprising:
a drawing control unit that causes a plurality of print elements arrayed in a print head to draw a test image used for checking operation statuses of the print elements on a recording medium, classifies at least a part of the plurality of print elements into a plurality of partial arrays in each of which a constant number of print elements are successively arrayed, classifies the plurality of partial arrays into a plurality of kinds so that the total number of print elements belonging to one kind of the partial arrays, when compared to the total number of print elements belonging to another kind of the partial arrays, are only commonly evenly divisible by 1, and causes the print elements disposed at corresponding positions in each of the plurality of patterns of partial arrays to sequentially draw lines on the recording medium in a predetermined direction of the recording medium so as to draw the test image.

2. The print control device as claimed in claim 1, wherein the print elements controlled by the drawing control unit are evenly spaced in a direction perpendicular to a relative movement direction between the print head and the recording medium in printing.

3. The print control device as claimed in claim 1, wherein the drawing control unit draws codes on the recording medium identifying the print elements corresponding to the lines in the test image.

4. The print control device as claimed in claim 1, further comprising:
 a defect information receiving unit that receives defect information on a print element having an operation defect checked on the basis of the test image; and
 a compensation unit that compensates a printing operation of the print head on the basis of the defect information.

5. The print control device as claimed in claim 4, wherein the compensation unit specifies the print element having the operation defect on the basis of the defect information.

6. The print control device as claimed in claim 5, wherein the compensation unit specifies the print element having the operation defect by using a predetermined table.

7. The print control device as claimed in claim 5, wherein the compensation unit specifies the print element having the operation defect by using a predetermined expression.

8. The print control device as claimed in claim 7, wherein the predetermined expression is a congruence expression expressing a relationship between at least one of print elements having an operation defect and an omission position input by the user.

9. The print control device as claimed in claim 4, wherein the defect information receiving unit checks the authenticity of the received defect information, and in a case where it is judged that the received defect information is false, the defect information receiving unit requests a reenter of defect information.

10. The print control device as claimed in claim 4, wherein the test image comprises an authenticity check image for checking the authenticity of the defect information.

11. A printing system comprising:
 a print head that includes a plurality of print elements, which prints image data on a recording medium, arrayed therein; and
 a drawing control unit that causes the print elements to draw a test image used for checking operation statuses of the print elements, classifies at least a part of the plurality of print elements into a plurality of partial arrays in each of which a constant number of print elements are successively arrayed, classifies the plurality of partial arrays into a plurality of kinds so that the total number of print elements belonging to one kind of the partial arrays, when compared to the total number of print elements belonging to another kind of the partial arrays, are only commonly evenly divisible by 1, and causes the print elements disposed at corresponding positions in each of the plurality of patterns of partial arrays to sequentially draw lines on the recording medium in a predetermined direction of the recording medium so as to draw the test image.

12. A non-transitory computer readable medium storing a program causing a computer to execute a process for controlling a print, the process comprising:
 classifying at least a part of a plurality of print elements into a plurality of partial arrays in each of which a constant number of print elements are successively arrayed;
 classifying the plurality of partial arrays into a plurality of kinds so that the total number of print elements belonging to one kind of the partial arrays, when compared to the total number of print elements belonging to another kind of the partial arrays, are only commonly evenly divisible by 1;
 causing the print elements disposed at positions corresponding to each other in each of the plurality of patterns of partial array to sequentially draw lines; and
 drawing a test image used for checking operation statuses of the print elements on the recording medium.

* * * * *